United States Patent
Iwafuchi et al.

(10) Patent No.: US 10,834,370 B2
(45) Date of Patent: Nov. 10, 2020

(54) IMAGE PROCESSING APPARATUS, IMAGE PROCESSING METHOD, AND NON-TRANSITORY COMPUTER READABLE MEDIUM FOR COLOR CONVERSION

(71) Applicant: FUJI XEROX CO., LTD., Tokyo (JP)

(72) Inventors: Toshihiro Iwafuchi, Kanagawa (JP); Noriko Sakai, Kanagawa (JP); Masashi Morimoto, Kanagawa (JP); Chizuru Ohsawa, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 0 days.

(21) Appl. No.: 16/018,084

(22) Filed: Jun. 26, 2018

(65) Prior Publication Data

US 2019/0132565 A1  May 2, 2019

(30) Foreign Application Priority Data

Oct. 31, 2017  (JP) .................... 2017-210438

(51) Int. Cl.
| | | |
|---|---|---|
| *H04N 9/73* | (2006.01) | |
| *H04N 9/04* | (2006.01) | |
| *H04N 1/60* | (2006.01) | |
| *H04N 1/62* | (2006.01) | |

(52) U.S. Cl.
CPC .......... *H04N 9/735* (2013.01); *H04N 1/6027* (2013.01); *H04N 1/628* (2013.01); *H04N 9/04* (2013.01)

(58) Field of Classification Search
CPC ...... H04N 9/735; H04N 1/6027; H04N 1/628; H04N 9/04
See application file for complete search history.

(56) References Cited

U.S. PATENT DOCUMENTS

| | | | |
|---|---|---|---|
| 9,602,685 B2 | 3/2017 | Miyauchi et al. | |
| 2006/0045381 A1* | 3/2006 | Matsuo ............... | H04N 19/139 382/276 |
| 2006/0066925 A1* | 3/2006 | Hasegawa ........... | H04N 1/6011 358/518 |
| 2007/0273942 A1* | 11/2007 | Miyata ................ | B41J 3/46 358/518 |
| 2009/0023991 A1* | 1/2009 | Gono ................. | A61B 1/00009 600/109 |
| 2013/0148177 A1* | 6/2013 | Kuraya .............. | H04N 1/00023 358/505 |

FOREIGN PATENT DOCUMENTS

| | | |
|---|---|---|
| JP | 2004213567 | 7/2004 |
| JP | 2016038732 | 3/2016 |

* cited by examiner

*Primary Examiner* — Gevell V Selby
(74) *Attorney, Agent, or Firm* — JCIPRNET

(57) ABSTRACT

An image processing apparatus includes an acceptance unit and a color conversion property creation unit. The acceptance unit accepts sets of image information each of which is composed of image information of an image before color conversion and image information of an image after color conversion. The color conversion property creation unit creates a color conversion property for color conversion of an image on the basis of pieces of image-capture setting information that are set for image-capture conditions used when the images before color conversion are captured.

13 Claims, 14 Drawing Sheets

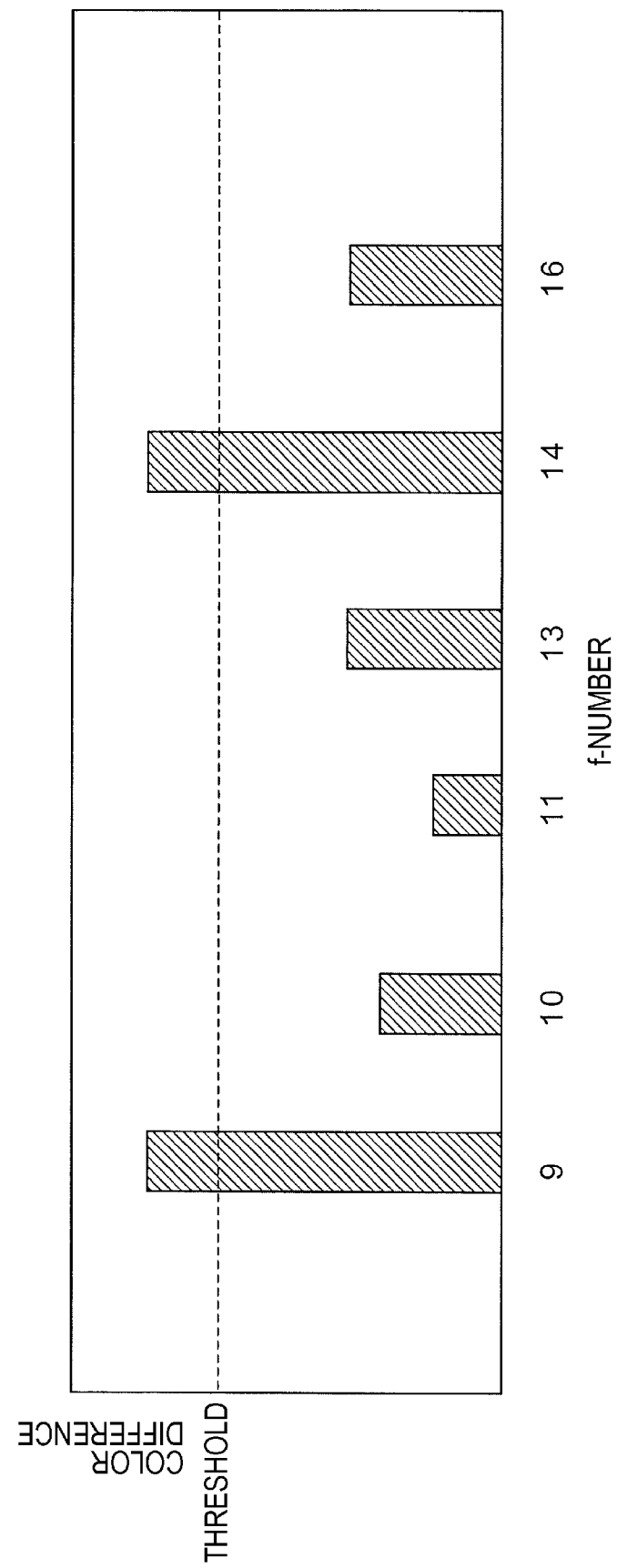

IMAGE INFORMATION
BEFORE COLOR ADJUSTMENT

RGBa1 = {0, 0, 255}
RGBa2 = {0, 32, 255}
RGBa3 = {0, 64, 255}
RGBa4 = {0, 96, 255}
RGBa5 = {0, 128, 255}

IMAGE BEFORE COLOR ADJUSTMENT

IMAGE INFORMATION
AFTER COLOR ADJUSTMENT

RGBb1 = {16, 0, 255}
RGBb2 = {16, 32, 255}
RGBb3 = {32, 64, 255}
RGBb4 = {32, 96, 255}
RGBb5 = {64, 128, 255}

IMAGE AFTER COLOR ADJUSTMENT

IMAGE PROCESSING APPARATUS, IMAGE PROCESSING METHOD, AND NON-TRANSITORY COMPUTER READABLE MEDIUM FOR COLOR CONVERSION

CROSS-REFERENCE TO RELATED APPLICATIONS

This application is based on and claims priority under 35 USC 119 from Japanese Patent Application No. 2017-210438 filed Oct. 31, 2017.

BACKGROUND

(i) Technical Field

The present invention relates to an image processing apparatus, an image processing method, and a non-transitory computer readable medium.

(ii) Related Art

With the widespread use of digital cameras, smartphones, tablets, and so on, the number of users who capture and view digital images is currently increasing. Such images are captured in various environments that are affected by illumination light and so on. Furthermore, images of various subjects are captured. Therefore, after image capturing, a captured image may be found to be an image not expected by the user, and the user often adjusts, for example, the color tone of the captured image.

SUMMARY

According to an aspect of the invention, there is provided an image processing apparatus including an acceptance unit and a color conversion property creation unit. The acceptance unit accepts sets of image information each of which is composed of image information of an image before color conversion and image information of an image after color conversion. The color conversion property creation unit creates a color conversion property for color conversion of an image on the basis of pieces of image-capture setting information that are set for image-capture conditions used when the images before color conversion are captured.

BRIEF DESCRIPTION OF THE DRAWINGS

An exemplary embodiment of the present invention will be described in detail based on the following figures, wherein:

FIG. 7 is a diagram for illustrating a method for selecting additional images;

DETAILED DESCRIPTION

Hereinafter, an exemplary embodiment of the present invention will be described in detail with reference to the attached drawings.

Description of Image Processing System

Figure 1:
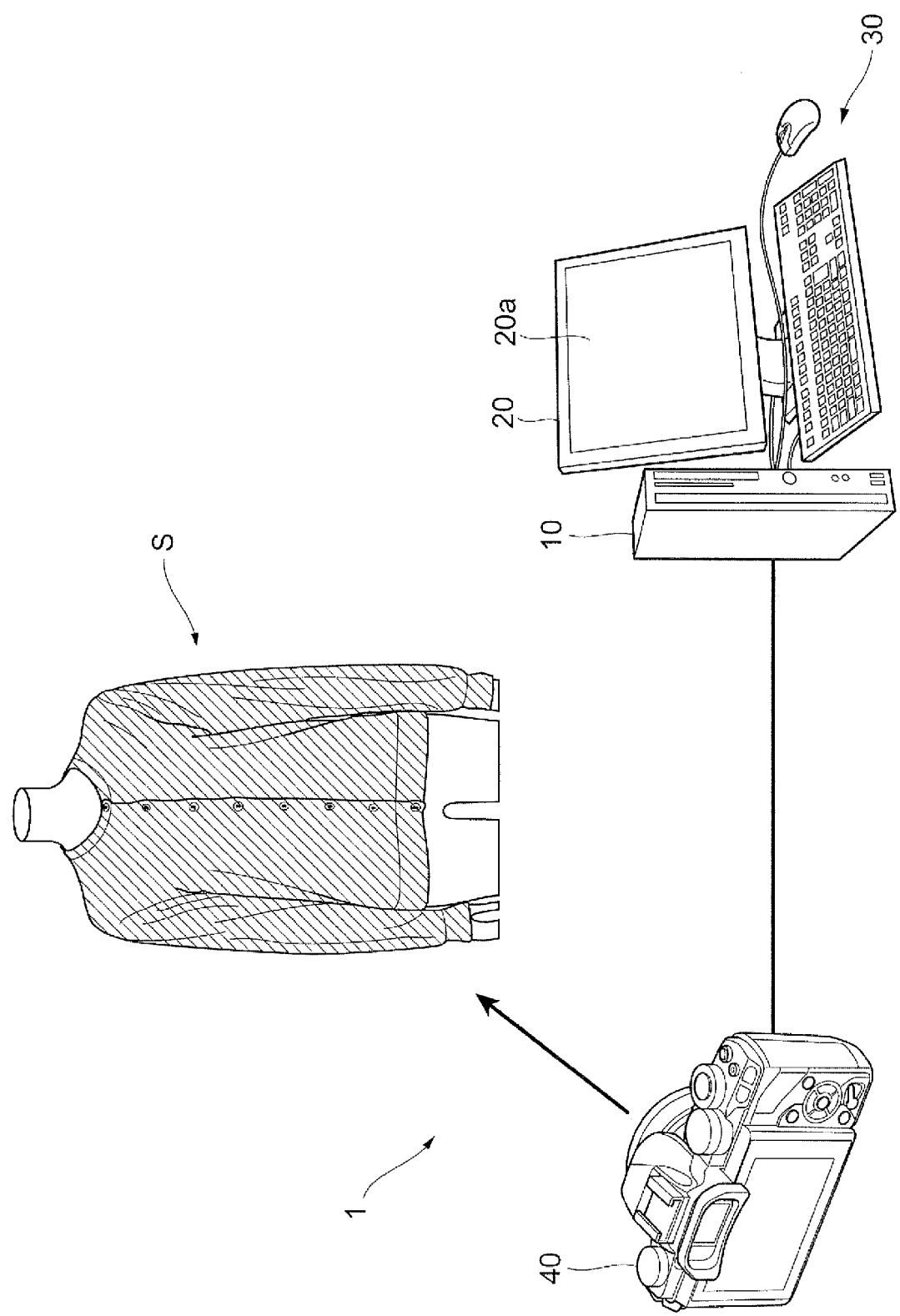
FIG. 1 is a diagram illustrating an example configuration of an image processing system according to an exemplary embodiment.

FIG. 1 is a diagram illustrating an example configuration of an image processing system 1 according to this exemplary embodiment.

As illustrated in FIG. 1, the image processing system 1 according to this exemplary embodiment includes an image processing apparatus 10, a display device 20, an input device 30, and a camera 40. The image processing apparatus 10 makes a color adjustment (color conversion) to an original image captured by using the camera 40. The display device 20 displays an image on the basis of display information output from the image processing apparatus 10. The input device 30 is used by a user to input various types of information to the image processing apparatus 10. The camera 40 is used to capture an image of an image-capture subject S and generates image information to which a color adjustment is made by the image processing apparatus 10.

The image processing apparatus 10 is, for example, a general-purpose personal computer (PC). The image processing apparatus 10 runs various types of application software under the control of an operating system (OS) to thereby make a color adjustment and so on.

The image processing apparatus 10 includes a central processing unit (CPU), which is an arithmetic unit, and a main memory and a hard disk drive (HDD), which are memories. The CPU executes various types of software including an OS (basic software) and application programs (application software). The main memory is a memory area for storing various types of software, data used in execution thereof, and so on. The HDD is a memory area for storing data input to various types of software, data output from various types of software, and so on.

The image processing apparatus 10 further includes a communication interface for external communication.

The display device 20 displays images on a display screen 20a. The display device 20 is constituted by, for example, a liquid crystal display for a PC, a liquid crystal display television, or a projector that has a function of displaying images. Therefore, the display system of the display device 20 is not limited to a liquid crystal display system. In the example illustrated in FIG. 1, the display screen 20a is provided in the display device 20. In a case of using, for example, a projector as the display device 20, the display screen 20a is a screen or the like that is provided external to the display device 20.

The input device 30 is constituted by a keyboard, a mouse, and so on. The input device 30 is used to input instructions for activating and terminating application software for a color adjustment and instructions given by the user to the image processing apparatus 10 for making a color adjustment in a case of a color adjustment.

The camera 40 is an example of an image capturing apparatus and includes, for example, an optical system that converges incident light and an image sensor that is an image sensing unit sensing the light converged by the optical system.

The optical system is formed of a single lens or is formed by combining plural lenses. In the optical system, for example, lenses are combined and the surfaces of the lenses are coated to thereby remove various aberrations. The image sensor is formed by arranging image sensing devices, such as charge-coupled devices (CCDs) or complementary metal-oxide semiconductors (CMOSs).

The image processing apparatus 10 and the display device 20 are connected to each other via Digital Visual Interface (DVI) and may be connected to each other via, for example, High-Definition Multimedia Interface (HDMI) (registered trademark) or DisplayPort instead of DVI.

The image processing apparatus 10 and the input device 30 are connected to each other via, for example, Universal Serial Bus (USB) and may be connected to each other via, for example, IEEE 1394 or RS-232C instead of USB.

The image processing apparatus 10 and the camera 40 are connected to each other via a wireline in the example illustrated in FIG. 1 and are connected to each other via, for example, USB, IEEE 1394, or RS-232C. Accordingly, image information of an image captured by using the camera 40 is transmitted to the image processing apparatus 10 via the wireline. However, the connection is not limited to this, and a wireless connection, such as a wireless local area network (LAN) or Bluetooth (registered trademark), may be used. The image processing apparatus 10 and the camera 40 need not be connected to each other, and image information may be passed to the image processing apparatus 10 via, for example, a memory card, such as an SD card.

In the image processing system 1 thus configured, first, the user captures an image of the image-capture subject S by using the camera 40. The image captured by using the camera 40 is an original image, and image information of the original image is transmitted to the image processing apparatus 10. On the display device 20, the original image, which is an image before color adjustment, is displayed. Next, when the user uses the input device 30 to input an instruction to be given to the image processing apparatus 10 for making a color adjustment, the image processing apparatus 10 makes a color adjustment to the original image. The result of this color adjustment is reflected to, for example, an image to be displayed on the display device 20, and the image after color adjustment different from the image before color adjustment is drawn and displayed on the display device 20.

On the basis of the result of color adjustment, the image processing apparatus 10 creates a color conversion property (color conversion model). The "color conversion model" represents a relationship between image information before color adjustment and image information after color adjustment. In other words, the "color conversion model" is a function that represents a relationship between image information before color adjustment and image information after color adjustment. When it is assumed that, for example, image information is RGB data composed of red (R), green (G), and blue (B) data and that image information before color adjustment is represented by $(R_a, G_a, B_a)$ and image information after color adjustment is represented by $(R_b, G_b, B_b)$, the color conversion model represents a relationship between $(R_a, G_a, B_a)$ and $(R_b, G_b, B_b)$.

Furthermore, the image processing apparatus 10 creates, on the basis of the color conversion model, a conversion relationship that is used in color conversion of image information of an original image before color adjustment to image information after color adjustment. The "conversion relationship" is conversion information for converting image information before color adjustment to image information after color adjustment. The conversion relationship is created as a look-up table (LUT). The LUT may be created as a multidimensional LUT or a one-dimensional LUT. The conversion relationship need not be an LUT and may be a multidimensional matrix. In addition to a multidimensional LUT, an LUT, and a matrix, the conversion relationship may be retained as training data (input/output data pair) for leaning.

In a case where image information is RGB data, the conversion relationship is information for converting image information before color adjustment $(R_a, G_a, B_a)$ to image information after color adjustment $(R_b, G_b, B_b)$, that is, for performing conversion $(R_a, G_a, B_a) \rightarrow (R_b, G_b, B_b)$. The conversion relationship is used to allow a color adjustment similar to a previously made color adjustment. That is, in a case where new image information before color adjustment is produced, the conversion relationship is used to perform color conversion, thereby allowing a color adjustment similar to a previously made color adjustment and generating image information after color adjustment. In this exemplary embodiment, a target image for which such color conversion (color adjustment) is to be performed by using the conversion relationship is hereinafter sometimes referred to as "color-conversion-target image".

In a case where the conversion relationship is created as a multidimensional LUT, here, the multidimensional LUT is a three-dimensional LUT to directly convert $(R_a, G_a, B_a)$ to $(R_b, G_b, B_b)$, that is, to perform conversion $(R_a, G_a, B_a) \rightarrow (R_b, G_b, B_b)$. In a case where the conversion relationship is created as a one-dimensional LUT, conversion is performed for each of R, G, and B data, that is, conversion $R_a \rightarrow R_b$, $G_a \rightarrow G_b$, and $B_a \rightarrow B_b$ is performed. This exemplary embodiment illustrates conversion in the RGB color space; however, the conversion may be conversion in another color space, such as the CMYK color space. In this case, image information is CMYK data composed of cyan (C), magenta (M), yellow (Y), and black (K) color data. In a case where the conversion relationship is created as a multidimensional LUT, here, the multidimensional LUT is a four-dimensional LUT to convert image information before color adjustment $(C_a, M_a, Y_a, K_a)$ to image information after color adjustment $(C_b, M_b, Y_b, K_b)$, that is, to perform conversion $(C_a, M_a, Y_a, K_a) \rightarrow (C_b, M_b, Y_b, K_b)$. In a case where the conversion relationship is created as a one-dimensional LUT, conversion is performed for each of C, M, Y, and K data, that is, conversion $C_a \rightarrow C_b$, $M_a \rightarrow M_b$, $Y_a \rightarrow Y_b$, and $K_a \rightarrow K_b$ is performed.

The image processing system 1 according to this exemplary embodiment is not limited to the form illustrated in FIG. 1. The image processing system 1 may be, for example, a tablet terminal. In this case, the tablet terminal includes a touch panel, and the touch panel displays images and is used to input user instructions by, for example, touching. That is, the touch panel functions as the display device 20 and the input device 30. As the camera 40, a camera built in the tablet terminal may be used. As an apparatus into which the display device 20 and the input device 30 are integrated, a touch monitor may be used. The touch monitor includes a touch panel that is used as the display screen 20a of the display device 20. In this case, an image is displayed on the touch monitor on the basis of image information output from the image processing apparatus 10. The user inputs an instruction for making a color adjustment by, for example, touching the touch monitor.

If image-capture conditions of the camera 40 or image-capture setting information for the image-capture conditions at the time of capturing an image of the image-capture subject S differ, colors are reproduced differently even if an image of the same image-capture subject S is captured. That is, if image-capture conditions of the camera 40 or image-capture setting information for the image-capture conditions differ, the colors of a captured image differ. Therefore, even in a case of capturing an image of the same image-capture subject S, if image-capture setting information differs, the direction for color adjustment is to differ. Here, the "image-capture conditions" refer to overall settings of the camera 40 at the time of capturing an image of the image-capture subject S. In this exemplary embodiment, among the "image-capture conditions", conditions that are likely to have an effect on reproduction of the colors of an image specifically require attention. Specifically, the "image-capture conditions" include, for example, the f-number, the ISO speed, and the shutter speed. An environmental condition, such as illumination, at the time of capturing an image of the image-capture subject S may be included in the image-capture conditions. The "image-capture setting information" is information about a set value for a variable in the image-capture conditions. For example, image-capture setting information is information indicating that the f-number is equal to 9.

Therefore, in a case of creating a color conversion property (color conversion model), image-capture setting information also needs to be taken into consideration. In a case where a color conversion model is created without taking into consideration image-capture setting information, the accuracy of the color conversion model may decrease. That is, in a case of color conversion without taking into consideration image-capture setting information, data having a different direction for color adjustment may be included, which may be a cause of a decrease in the accuracy of a color conversion model derived from plural sets of image information. In this case, also the accuracy of a conversion relationship created on the basis of the color conversion model decreases, and it becomes difficult to make a color adjustment similar to a previously made color adjustment. That is, intended color conversion is not performed.

To avoid such a situation, for example, a color conversion model may be created for each of the image-capture conditions or each piece of image-capture setting information for the image-capture conditions. However, plural pieces of image-capture setting information are present and range widely. To create a color conversion model for every piece of image-capture setting information to cover the entire range, an image of the image-capture subject S needs to be captured and a set of image information needs to be prepared for each piece of image-capture setting information. In this case, however, the number of sets of image information that need to be prepared is likely to increase to an excessively large number, and considerable time and efforts are likely to be taken to create color conversion models. On the other hand, if the number of sets of image information is decreased, the accuracy of the color conversion models decreases.

In the related art, a method is available in which images of a subject captured under limited image-capture conditions are initially registered, the initially registered images are analyzed, and an image capturing apparatus is caused to obtain a missing image needed for learning. However, in this method, it is difficult to collect images captured under fixed specific image-capture conditions. Furthermore, in this method, an extremely large number of images are needed as in the above-described case, and the features of the collected images vary. As a result, the accuracy of the color conversion model is likely to decrease.

In the related art, another method is available in which an increase parameter for increasing the number of initial images is determined, and the number of initial images is increased by using the increase parameter to generate leaning data. However, in this method, only the number of images under specific image-capture conditions is increased, and it is difficult to compensate for insufficient learning data. As a result, the accuracy of the color conversion model is likely to decrease similarly.

Accordingly, in this exemplary embodiment, the image processing apparatus 10 is configured as described below to create a color conversion model suitable for image-capture setting information of the camera 40 that obtains pieces of image information.

Description of Image Processing Apparatus 10

Figure 2:
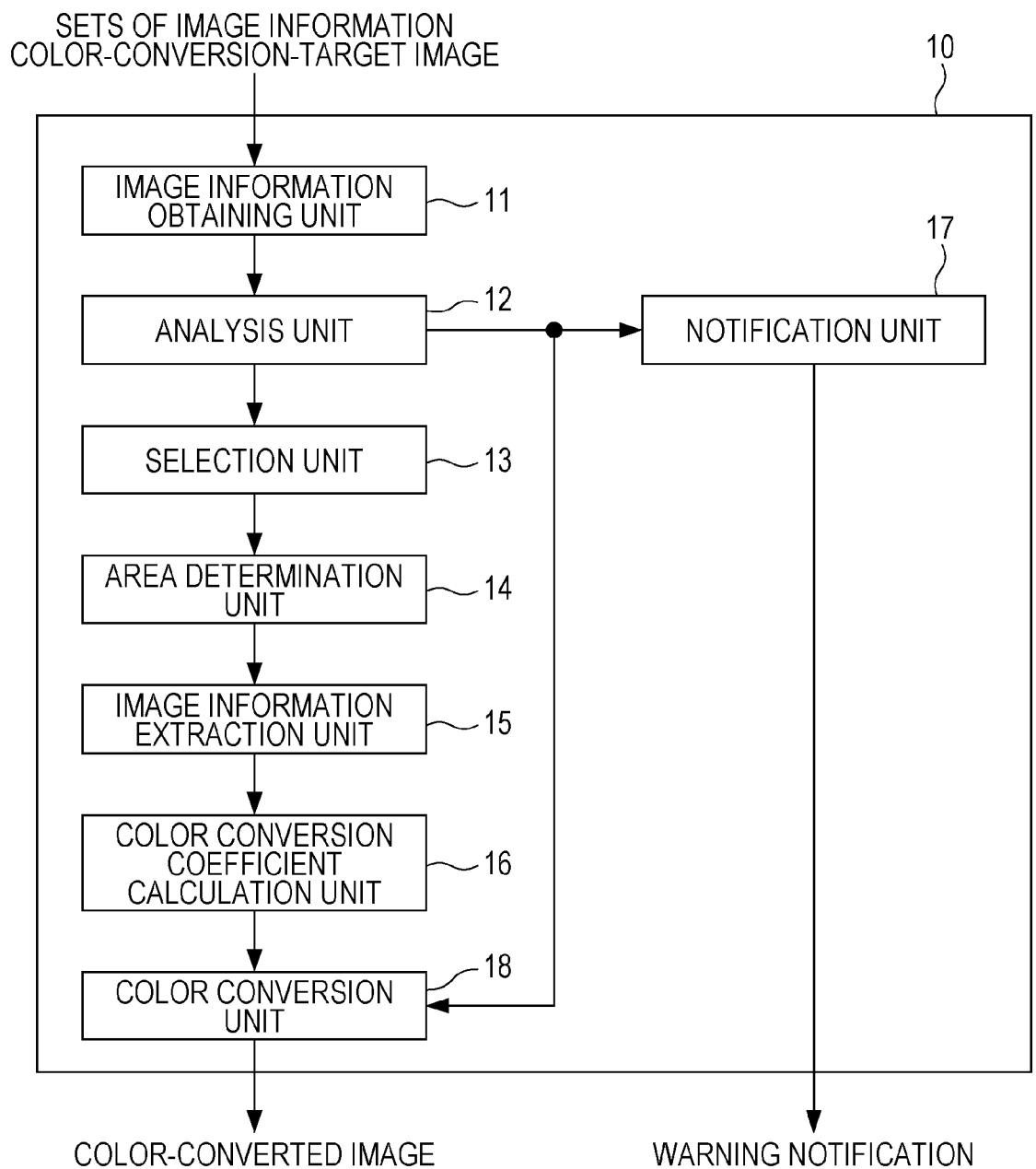
FIG. 2 is a block diagram illustrating an example functional configuration of an image processing apparatus according to an exemplary embodiment.

FIG. 2 is a block diagram illustrating an example functional configuration of the image processing apparatus 10 according to this exemplary embodiment. FIG. 2 illustrates functions related to this exemplary embodiment and selected from among various functions of the image processing apparatus 10.

As illustrated in FIG. 2, the image processing apparatus 10 according to this exemplary embodiment includes an image information obtaining unit 11, an analysis unit 12, a selection unit 13, an area determination unit 14, an image information extraction unit 15, a color conversion coefficient calculation unit 16, a notification unit 17, and a color conversion unit 18. The image information obtaining unit 11 obtains image information. The analysis unit 12 analyzes image-capture setting information. The selection unit 13 selects sets of image information. The area determination unit 14 determines an area from which image information is extracted. The image information extraction unit 15 extracts image information. The color conversion coefficient calculation unit 16 calculates a color conversion coefficient as a conversion relationship. The notification unit 17 sends a notification to the user. The color conversion unit 18 performs color conversion on a color-conversion-target image.

The image information obtaining unit 11 obtains pieces of image information of images before color adjustment (color conversion) captured by using the camera 40 and pieces of image information of images after color adjustment for which a color adjustment has been made by the user as sets of image information. The image information obtaining unit 11 obtains image information of a color-conversion-target image that is a target of color conversion using a color conversion model created by using a method described below.

These pieces of image information are in a data format for display on the display device 20 and are, for example, RGB data described above. The image information obtaining unit 11 may obtain image information in another data format and perform color conversion on the image information to obtain, for example, RGB data.

As described above, the image information obtaining unit 11 functions as an acceptance unit that accepts sets of image information each of which is composed of image information before color conversion and image information after color conversion.

Figure 3:
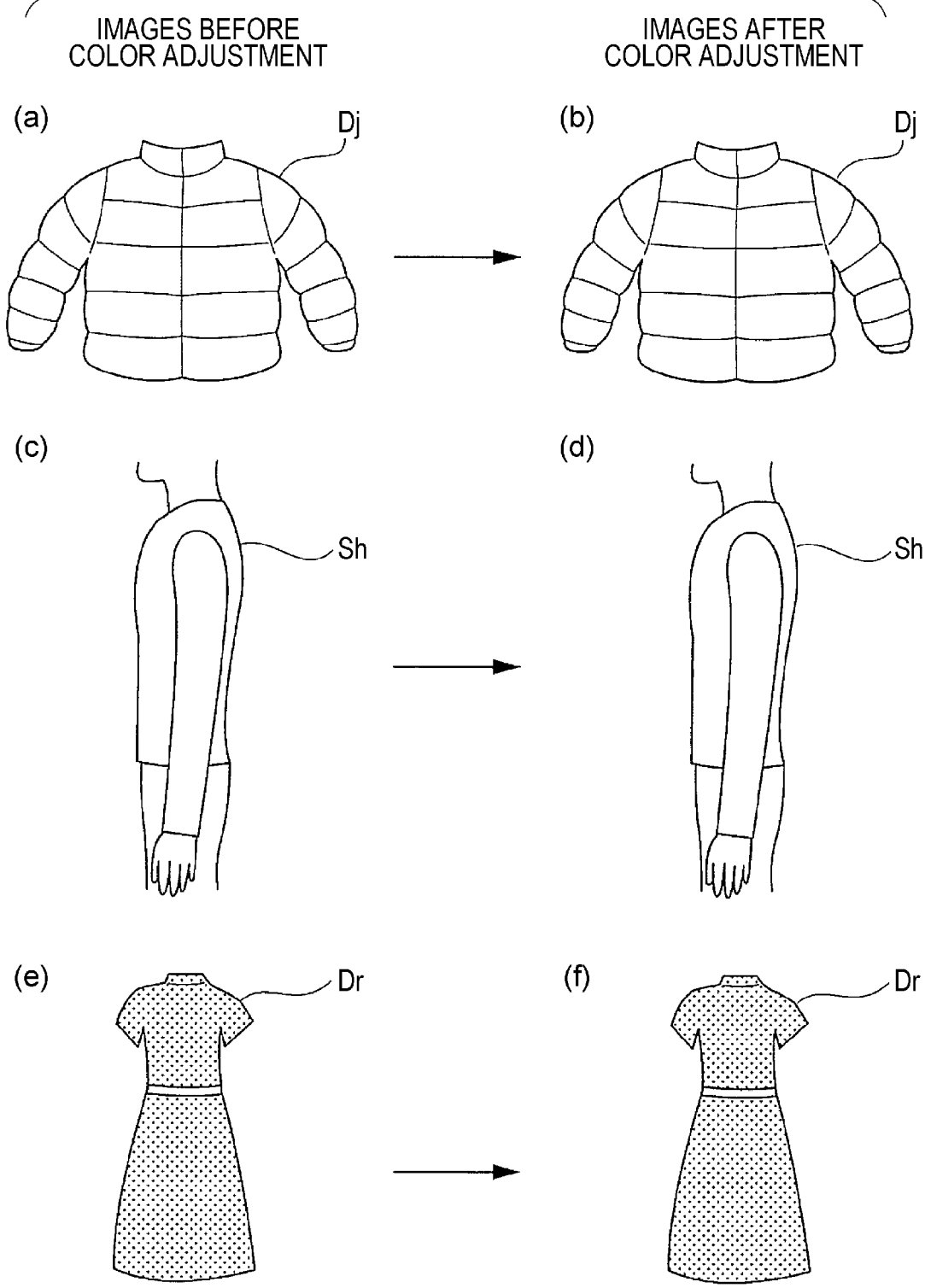
FIG. 3 is a diagram in which (a) to (f) illustrate example sets of image information obtained by an image information obtaining unit.

FIG. 3 is a diagram in which (a) to (f) illustrate example sets of image information obtained by the image information obtaining unit 11.

FIG. 3 illustrates a case where three sets of image information are prepared, which are obtained when images of clothes that are items for sale and an image of a person wearing a cloth that is an item for sale are captured. In FIG. 3, (a) and (b) illustrate a set of image information obtained when an image of a down jacket Dj is captured. Here, (a) in FIG. 3 is an image before color adjustment, and (b) in FIG. 3 is an image after color adjustment. In FIG. 3, (c) and (d) illustrate a set of image information obtained when an image of a person wearing a shirt Sh is captured. Here, (c) in FIG. 3 is an image before color adjustment, and (d) in FIG. 3 is an image after color adjustment. In FIG. 3, (e) and (f) illustrate a set of image information obtained when an image of a dress Dr is captured. Here, (e) in FIG. 3 is an image before color adjustment, and (f) in FIG. 3 is an image after color adjustment.

As described above, in this exemplary embodiment, plural sets of images before color adjustment (color conversion) and images after color adjustment are prepared to obtain sets of image information including a larger number of colors.

The analysis unit 12 analyzes image-capture setting information of an image captured by using the camera 40. Here, the analysis unit 12 analyses image-capture setting information when an image before color adjustment (color conversion) is captured.

An analysis of image-capture setting information performed by the analysis unit 12 is described in detail below.

The analysis unit 12 uses Exchangeable image file format (Exif) information that is used as a header of image information to perform an analysis of image-capture setting information. The Exif information includes information, such as the f-number, the ISO speed, and the shutter speed. The f-number is a value obtained by dividing the focal length of the lens by the effective aperture, is an indicator indicating the brightness of the lens, and is also referred to as the aperture setting. The ISO speed is an international standard indicating a degree to which the film is able to record weak light thereon and, in a case of a digital camera, represents an indicator indicating a degree of amplification, within the camera, of light entering through the lens. The shutter speed is the length of time when the shutter is open. In this exemplary embodiment, the analysis unit 12 first creates a distribution of the number of images before color adjustment relative to at least one type of image-capture setting information. Here, a description is given of a case where the analysis unit 12 creates a distribution of the number of images before color adjustment relative to the f-number setting, which is one of the image-capture conditions.

Figure 4:
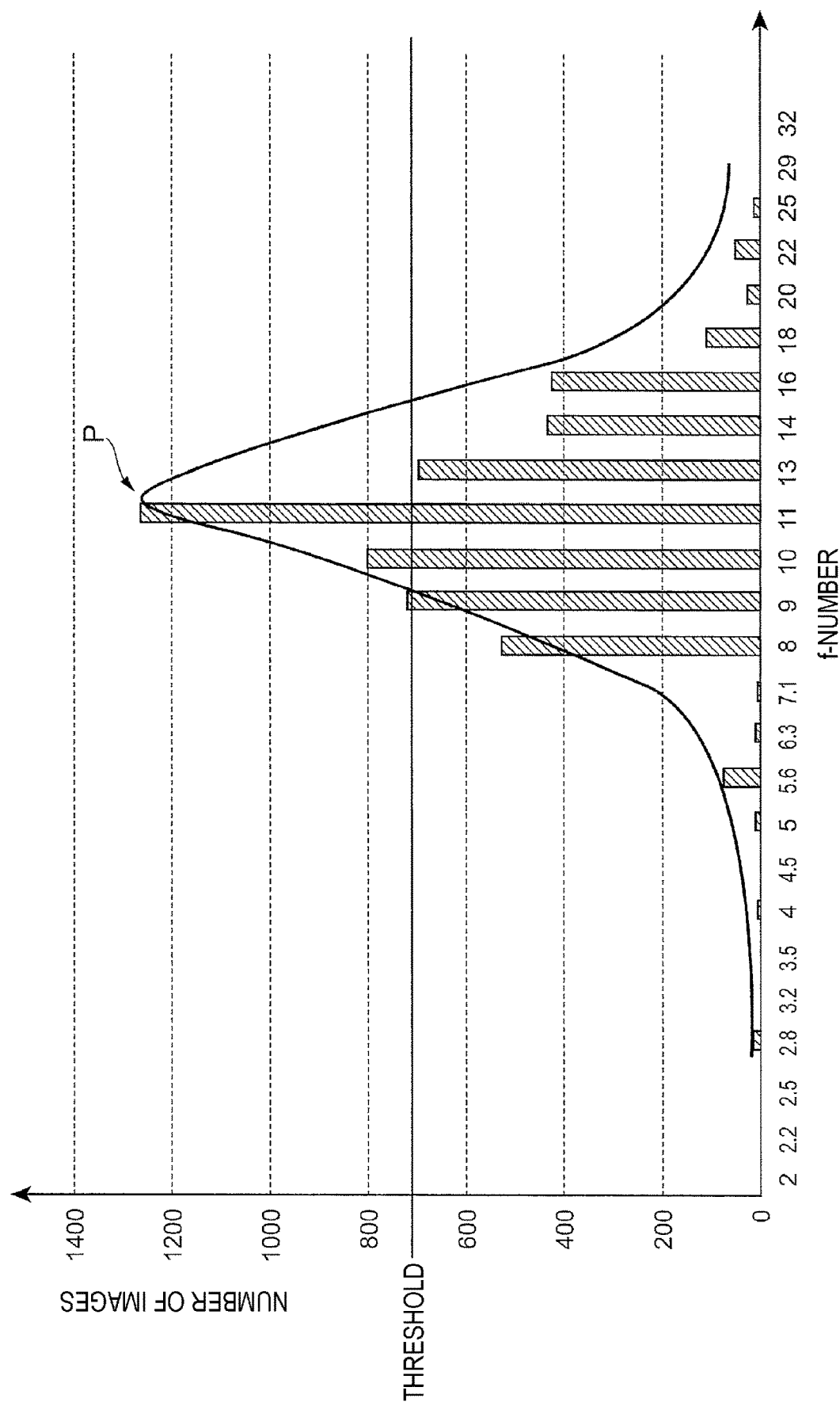
FIG. 4 is a diagram illustrating a first example of a distribution of the number of images before color conversion relative to an f-number setting created by an analysis unit.

FIG. 4 is a diagram illustrating a first example of a distribution of the number of images before color adjustment relative to the f-number setting created by the analysis unit 12. In FIG. 4, the horizontal axis represents the f-number, and the vertical axis represents the number of images before color adjustment.

In the example illustrated in FIG. 4, the number of images before color adjustment increases as the f-number increases from 2, and reaches its peak (local maximum) P when the f-number is equal to 11. The number of images before color adjustment decreases as the f-number increases to more than 11. That is, in this case, the number of images before color adjustment has one peak P when the f-number is equal to 11, and around the peak P, the number of images before color adjustment mostly decreases as the f-number becomes far from the f-number corresponding to the peak P. The number of images at the peak P is equal to or larger than a predetermined threshold. Hereinafter, the case as illustrated in FIG. 4 where the number of images before color adjustment has one peak (peak P) that is equal to or larger than a threshold may be referred to as "case 1".

Figure 5:
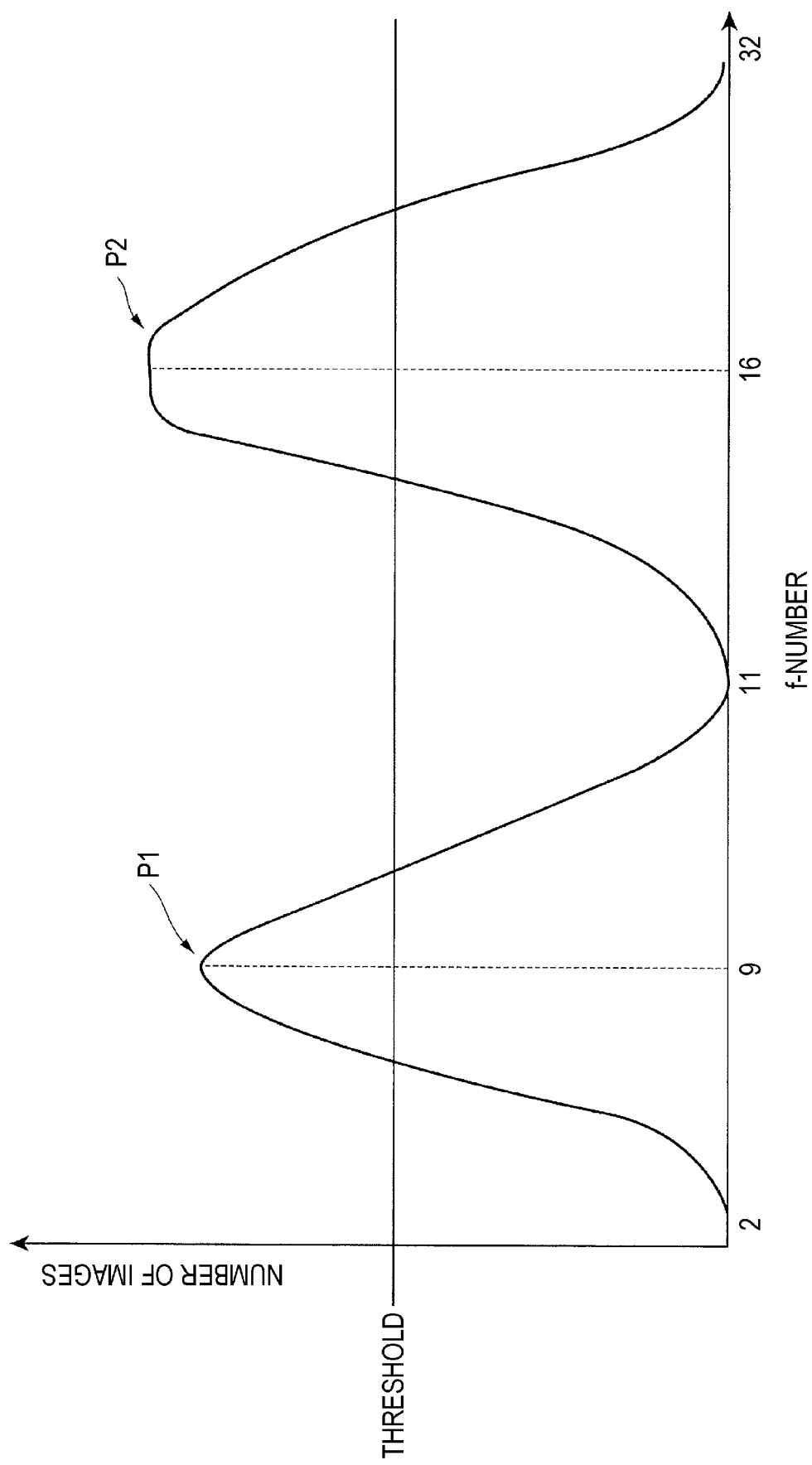
FIG. 5 is a diagram illustrating a second example of a distribution of the number of images before color conversion relative to an f-number setting created by an analysis unit.

FIG. 5 is a diagram illustrating a second example of a distribution of the number of images before color adjustment relative to the f-number setting created by the analysis unit 12. Also in FIG. 5, the horizontal axis represents the f-number, and the vertical axis represents the number of images before color adjustment.

In the example illustrated in FIG. 5, the number of images before color adjustment increases as the f-number increases from 2, and reaches its first peak (local maximum) P1 when the f-number is equal to 9. The number of images before color adjustment decreases as the f-number increases to more than 9, and reaches its local minimum when the f-number is equal to 11. The number of images before color adjustment increases as the f-number increases to more than 11, and reaches its second peak P2 when the f-number is equal to 16. The number of images before color adjustment decreases as the f-number increases to more than 16. The number of images at the peak P1 and the number of images at the peak P2 are equal to or larger than a predetermined threshold. That is, in this case, the number of images before color adjustment has two peaks, namely, the peak P1 when the f-number is equal to 9 and the peak P2 when the f-number is equal to 16. Around the peak P1 and the peak P2, the number of images before color adjustment mostly decreases as the f-number becomes far from the f-number corresponding to the peak P1 and as the f-number becomes far from the f-number corresponding to the peak P2. Hereinafter, the case as illustrated in FIG. 5 where the number of images before color adjustment has plural peaks (peaks P1 and P2) that are equal to or larger than a threshold may be referred to as "case 2".

Figure 6:
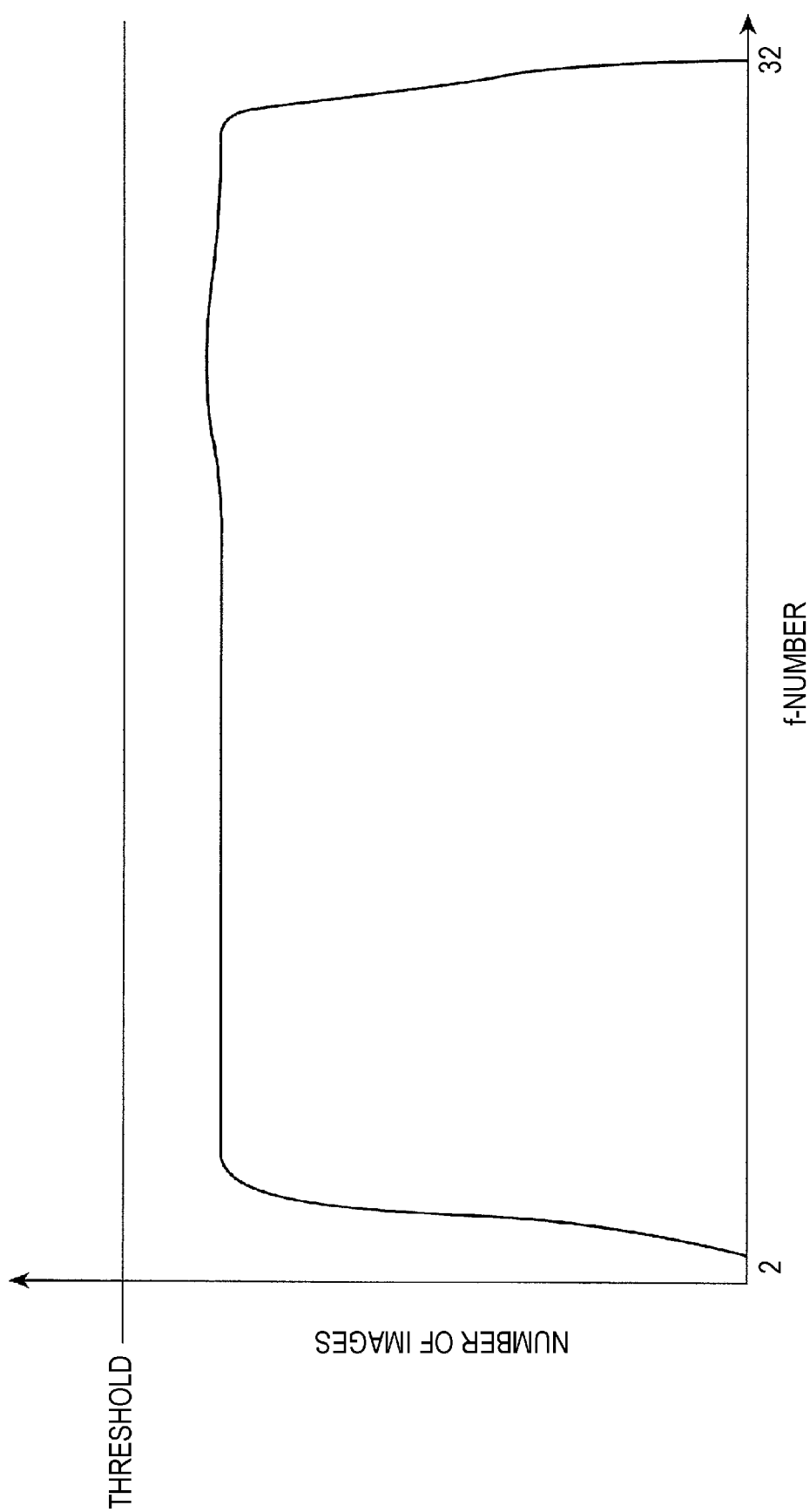
FIG. 6 is a diagram illustrating a third example of a distribution of the number of images before color conversion relative to an f-number setting created by an analysis unit.

FIG. 6 is a diagram illustrating a third example of a distribution of the number of images before color adjustment relative to the f-number setting created by the analysis unit 12. Also in FIG. 6, the horizontal axis represents the f-number, and the vertical axis represents the number of images before color adjustment.

In the example illustrated in FIG. 6, the number of images before color adjustment is approximately constant throughout the range of the f-number and does not reach a peak (local maximum) for any value of the f-number. Hereinafter, the case as illustrated in FIG. 6 where the number of images before color adjustment does not have a peak equal to or larger than a threshold may be referred to as "case 3".

The analysis unit 12 further analyzes image-capture setting information when color-conversion-target images as described above are captured.

The analysis unit 12 performs an analysis of image-capture setting information similar to that described with reference to FIG. 4 to FIG. 6 also for color-conversion-target images. That is, in this case, the analysis unit 12 creates a distribution of the number of color-conversion-target images relative to the f-number.

The analysis unit 12 further calculates a matching degree obtained by comparing the image-capture setting information of the color-conversion-target images with image-capture setting information of images before color conversion selected when a color conversion property (color conversion model) is created. That is, the analysis unit 12 analyses a degree to which the image-capture setting information of the color-conversion-target images matches image-capture setting information of images before color conversion selected by the selection unit 13 described below. That is, the "matching degree" may be an indicator indicating a degree to which the image-capture setting information of the color-conversion-target images matches image-capture setting information of images before color conversion selected when a color conversion property (color conversion model) is created. For example, the matching degree may be the ratio of image-capture setting information of images before color conversion that is included in the image-capture setting information of the color-conversion-target images, the images before color conversion being selected when a color conversion property (color conversion model) is created. For example, in a case where image-capture setting information of images before color conversion selected when a color conversion property (color conversion model) is created indicates that the f-number is equal to 11, if 50 images out of 100 color-conversion-target images are images for which the f-number is equal to 11, the matching degree is 50%. Accordingly, it is possible to determine whether the color conversion model to be used in color conversion of the color-conversion-target images is suitable. That is, if the matching degree is larger, the color conversion model is assumed to be more suitable for color conversion of the color-conversion-target images, and if the matching degree is smaller, the color conversion model is assumed to be less suitable for color conversion of the color-conversion-target images.

The selection unit 13 selects, on the basis of image-capture setting information, images to be used in creating a color conversion model by the color conversion coefficient calculation unit 16.

In this exemplary embodiment, the selection unit 13 selects images that correspond to a piece of image-capture setting information for which the number of images is larger than those for the other pieces of image-capture setting information among the pieces of image-capture setting information for at least one of the image-capture conditions. Specifically, the selection unit 13 checks a distribution of the number of images before color conversion relative to at least one type of image-capture setting information and selects highly frequent images for which the number of images is larger. That is, "highly frequent images" are images that correspond to a piece of image-capture setting information for which the number of images is larger in the distribution of the number of images before color conversion relative to at least one type of image-capture setting information.

More specifically, the selection unit 13 selects, as highly frequent images, images that correspond to a piece of image-capture setting information corresponding to a local maximum equal to or larger than a predetermined number in a distribution of the number of images relative to pieces of image-capture setting information. A description is given below with reference to the example illustrated in FIG. 4. A predetermined number of images is set as a threshold as illustrated in FIG. 4. As images for which the number of images is equal to or larger than the predetermined number of images and reaches a peak (local maximum), images for which the f-number is equal to 11 are selected as highly frequent images. In the example illustrated in FIG. 5, a predetermined number of images is set as a threshold as illustrated in FIG. 5. As images for which the number of images is equal to or larger than the predetermined number of images and reaches a peak (local maximum), images for which the f-number is equal to 9 and images for which the f-number is equal to 16 are selected as highly frequent images. On the other hand, in the example illustrated in FIG. 6, the number of images does not increase to a threshold or more, and therefore, there are no highly frequent images.

In a case where there are plural peaks (local maxima) as illustrated in FIG. 5, it is desirable that the selection unit 13 select, as highly frequent images, images for which the number of images reaches each of the local maxima if a difference in image-capture setting information is equal to or larger than a predetermined value. That is, in a case where there are plural peaks as illustrated in FIG. 5, images for which the number of images reaches each of the local maxima are used as highly frequent images if the peaks are far from each other by a predetermined difference or more. If the peaks are far from each other by less than the predetermined difference, that is, if the peaks are close to each other, images for which the number of images reaches the higher peak (for which the number of images is larger) are used as highly frequent images.

In the above-described examples, images corresponding to one piece of image-capture setting information for which the number of images reaches a peak (local maximum) are used as highly frequent images; however, images corresponding to a piece of image-capture setting information around the peak may also be used as highly frequent images. In the example illustrated in FIG. 4, images for which the f-number is equal to 10 and images for which the f-number is equal to 13 may also be used as highly frequent images in addition to images for which the f-number is equal to 11. In the example illustrated in FIG. 5, images for which the f-number is equal to 8 and images for which the f-number is equal to 10, the f-numbers being close to 9, and images for which the f-number is equal to 14 and images for which the f-number is equal to 18, the f-numbers being close to 16, may also be used as highly frequent images in addition to images for which the f-number is equal to 9 and images for which the f-number is equal to 16. That is, the selection unit 13 also selects images corresponding to plural pieces of image-capture setting information including a piece of image-capture setting information for which the number of images reaches a peak, as highly frequent images. Determination as to whether images are to be used as highly frequent images may be performed by using the matching degree, or images that are within a predetermined matching degree may be used as highly frequent images.

It is desirable that the selection unit 13 select, from among images not corresponding to a piece of image-capture setting information that corresponds to highly frequent images, an image for which a difference determined by comparing image information obtained as a result of color conversion of the image, which is an image before color conversion, using a color conversion model created by using the highly frequent images with image information of the corresponding image after color conversion is within a predetermined range, as an additional image. Here, the difference is a difference in color values and, for example, is a color difference (dE), which is the Euclidean distance between the color values. However, the difference is not limited to this and may be a difference in at least one color value. For example, the difference may be, for example, a difference in luminance (dL) or a difference in hue (dh) in the HSL color space. The difference may be, for example, a difference in chroma (dC) or a difference in hue angle (dθ) in the L*a*b* color space.

That is, in a case where the accuracy of a color conversion model created by using highly frequent images is high, the difference between a color value obtained as a result of color conversion of an image before color conversion using the color conversion model and a color value in image information of the corresponding image after color conversion obtained by the image information obtaining unit 11 decreases. On the other hand, if the accuracy of the color conversion model is not high, the difference increases. Therefore, when the difference is checked, a piece of image-capture setting information for which a high accuracy is achieved by using the color conversion model is known. Accordingly, images that are captured with this piece of image-capture setting information are also used as additional images to be used in creating a color conversion model, thereby increasing the number of sets of image information to be used in creating a color conversion model. As a result, the accuracy of the color conversion model is likely to further increase. That is, "additional images" are images that are added as images desirable for use in creating a color conversion model suitable for a specific piece of image-capture setting information in addition to highly frequent images.

FIG. 7 is a diagram for illustrating a method for selecting additional images. In FIG. 7, the horizontal axis represents the f-number, and the vertical axis represents the color difference (dE).

FIG. 7 illustrates the color difference relative to the f-number ranging from 9 to 16. Here, it is assumed that the number of images reaches a peak as described above when the f-number is equal to 11 and that images for which the number of images reaches a local maximum, that is, highly frequent images, are images for which the f-number is equal to 11. Then, a predetermined threshold is determined, and images that correspond a piece of image-capture setting information for which the color difference is equal to or smaller than the threshold are used as additional images. That is, in this case, "the difference is within a predetermined range" means that "the color difference is within a range equal to or smaller than the threshold". In this example, images captured with pieces of image-capture setting information respectively indicating that the f-number is equal to 10, 13, and 16 are also used as additional images that are used in creating a color conversion model. That is, sets of image information that correspond to pieces of image-capture setting information respectively indicating that the f-number is equal to 10, 11, 13, and 16 are used in creating a color conversion model. Images captured with pieces of image-capture setting information respectively indicating that the f-number is equal to 9 and 14 are not used as additional images, and sets of image information that correspond to these pieces of image-capture setting information are not used in creating a color conversion model.

In a case of selecting additional images, if a piece of image-capture setting information for which the above-described difference is equal to or larger than the predetermined range is present between a piece of image-capture setting information of images for which the difference is within the predetermined range and a piece of image-capture setting information that corresponds to highly frequent images, the selection unit 13 need not select the images for which the difference is within the predetermined range as additional images.

That is, in the example illustrated in FIG. 7, the color difference is equal to or smaller than the threshold when the f-number is equal to 16; however, a piece of image-capture setting information indicating that the f-number is equal to 14 for which the color difference is equal to or larger than the threshold is present between the piece of image-capture setting information indicating that the f-number is equal to 16 and the piece of image-capture setting information indicating that the f-number is equal to 11 which corresponds to highly frequent images. In this case, images that are captured with the piece of image-capture setting information indicating that the f-number is equal to 16 are not selected as additional images.

The area determination unit 14 determines an area from which image information is extracted for either an image before color adjustment (color conversion) or a corresponding image after color adjustment.

That is, the area determination unit 14 determines, for example, a position, in an image illustrated in FIG. 3, from which image information is obtained. In the example illustrated in FIG. 3, a color adjustment is made to a portion corresponding to the cloth that is an item for sale. That is, the color of an item for sale is required to be reproduced more precisely so that the color of the actual item for sale and the color of the item for sale displayed as an image match each other. Therefore, an item for sale is likely to be a color adjustment target.

Specifically, the area determination unit 14 determines, for example, a portion other than the background to be an area from which image information is extracted. Accordingly, the area determination unit 14 needs to determine the background and a portion other than the background. Image information of the background is substantially the same as image information of a left end portion of the image. Therefore, a portion in which image information significantly differs from the image information of a left end portion of the image is determined to be a portion other than the background. In order to sample image information that is compared with the image information of a left end portion of the image, for example, pixel positions are selected at predetermined intervals in the image, and image information of a pixel at each pixel position is compared with image information of a pixel in a left end portion of the image. Alternatively, a mask having a predetermined size may be applied to the image information, and the average value of image information within the mask may be compared with image information of a pixel in a left end portion of the image.

As another method for determining the area, the area determination unit 14 performs a frequency analysis on the basis of the image information and obtains a pixel position at which a high frequency is produced. This pixel position corresponds to the outline of a portion other than the background, and therefore, the area determination unit 14 determines the portion inside the outline to be a portion other than the background. Furthermore, as yet another method for determining the area, the area determination unit 14 defines an area centered on the center of the image and having a predetermined size and determines a portion within the area to be a portion other than the background.

The area determination unit 14 performs processing as described above for either an image before color adjustment (color conversion) or a corresponding image after color adjustment to determine an area from which image information is extracted.

The image information extraction unit 15 extracts image information from within the area in one image, among the image before color adjustment (color conversion) and the image after color adjustment, specified by the area determination unit 14 and from within an area, in the other image, corresponding to the area in the one image. In other words, the image information extraction unit 15 extracts image information from an image before color adjustment and extracts image information from a corresponding image after color adjustment as a set of image information at corresponding positions in the images.

That is, the image information extraction unit 15 extracts image information before color adjustment and image information after color adjustment from an image before color adjustment and from a corresponding image after color adjustment at the same positions in the images.

Figure 8A:
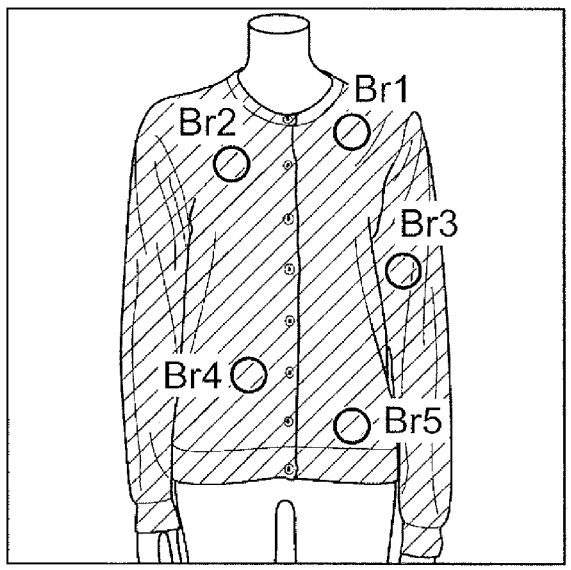
FIGS. 8A and 8B are diagrams illustrating an example set of image information before color adjustment and image information after color adjustment.
Figure 8B:
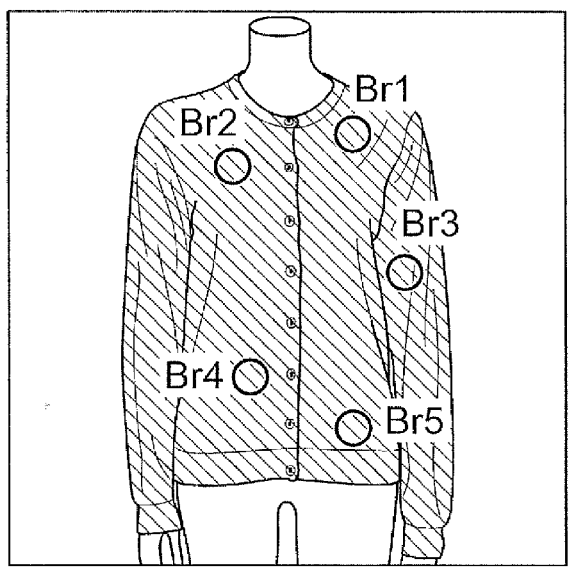

FIGS. 8A and 8B are diagrams illustrating an example set of image information before color adjustment and image information after color adjustment.

FIG. 8A illustrates an example image before color adjustment and example pieces of image information before color adjustment. In FIG. 8A, the image before color adjustment is an image of a blouse, from which pieces of image information are extracted from portions indicated by Br1 to Br5 and are respectively indicated as RGBa1 to RGBa5. In this case, the blouse is entirely blue, and therefore, all of the pieces of image information RGBa1 to RGBa5 are pieces of RGB data indicating blue.

FIG. 8B illustrates an example image after color adjustment and example pieces of image information after color adjustment. In FIG. 8B, pieces of image information respectively extracted from the same portions indicated by Br1 to Br5 as in FIG. 8A are indicated as RGBb1 to RGBb5.

The image information extraction unit 15 obtains image information before color adjustment (color conversion) and corresponding image information after color adjustment as a set of extracted image information by using the method as described above.

The color conversion coefficient calculation unit 16 creates a color conversion model. That is, the color conversion coefficient calculation unit 16 functions as a color conversion property creation unit that creates a color conversion property (color conversion model) for color conversion of images. Here, the color conversion coefficient calculation unit 16 creates a color conversion model on the basis of image-capture setting information that is set for the image-capture conditions used to capture images before color conversion, as described above. At this time, images that are selected are highly frequent images and additional images described above. Furthermore, the color conversion coefficient calculation unit 16 creates a conversion relationship represented by, for example, a three-dimensional LUT on the basis of the color conversion model.

Figure 9:
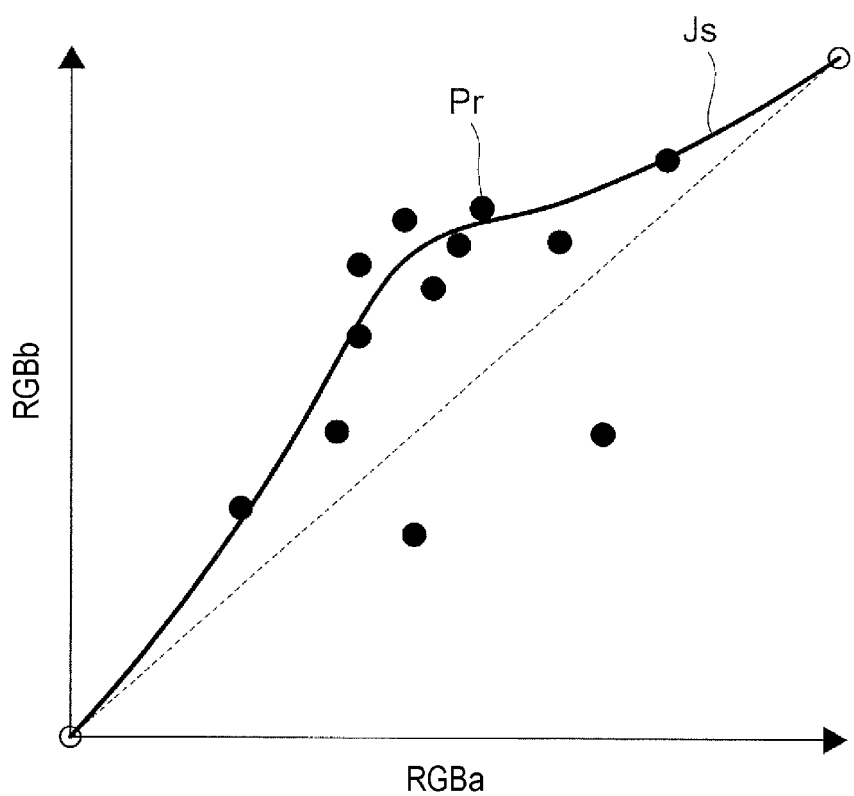
FIG. 9 is a diagram illustrating an example color conversion model.

FIG. 9 is a diagram illustrating an example color conversion model.

In FIG. 9, the horizontal axis represents image information before color adjustment (color conversion), and the vertical axis represents image information after color adjustment. The image information before color adjustment and the image information after color adjustment are RGB data.

In FIG. 9, the image information before color adjustment is indicated as RGBa, and the image information after color adjustment is indicated as RGBb.

The black dots Pr represent the results of plotting pieces of image information before color adjustment and pieces of image information after color adjustment. FIG. 9 illustrates a case where twelve sets of image information before color adjustment and image information after color adjustment are obtained.

The solid line Js represents the relationship between the image information before color adjustment and the image information after color adjustment and represents the color conversion model created by the color conversion coefficient calculation unit 16. That is, the color conversion model may be regarded as a function that represents the relationship between the image information before color adjustment and the image information after color adjustment. When this function is expressed by f, the color conversion model is expressed by RGBb=f(RGBa). The color conversion model may be created by using a publicly known method. However, it is desirable that a method having high fitting performance for nonlinear properties, namely, a weighted regression model or a neural network, be used. Note that nonlinear properties need not be used, and linear properties using a matrix model may be used.

The notification unit 17 sends a warning notification to the user. The warning notification is not specifically limited, and a notification method in which a warning message is displayed on the display device 20 and a notification method in which a notification is sent by using a sound, such as speech or a warning beep, are available.

The color conversion unit 18 uses the conversion relationship created by the color conversion coefficient calculation unit 16 to perform color conversion on a color-conversion-target image. Accordingly, the color of the color-conversion-target image is converted, and a color-converted image is obtained.

Description of Operations of Image Processing Apparatus 10

Now, operations of the image processing apparatus 10 are described.

Figure 10:
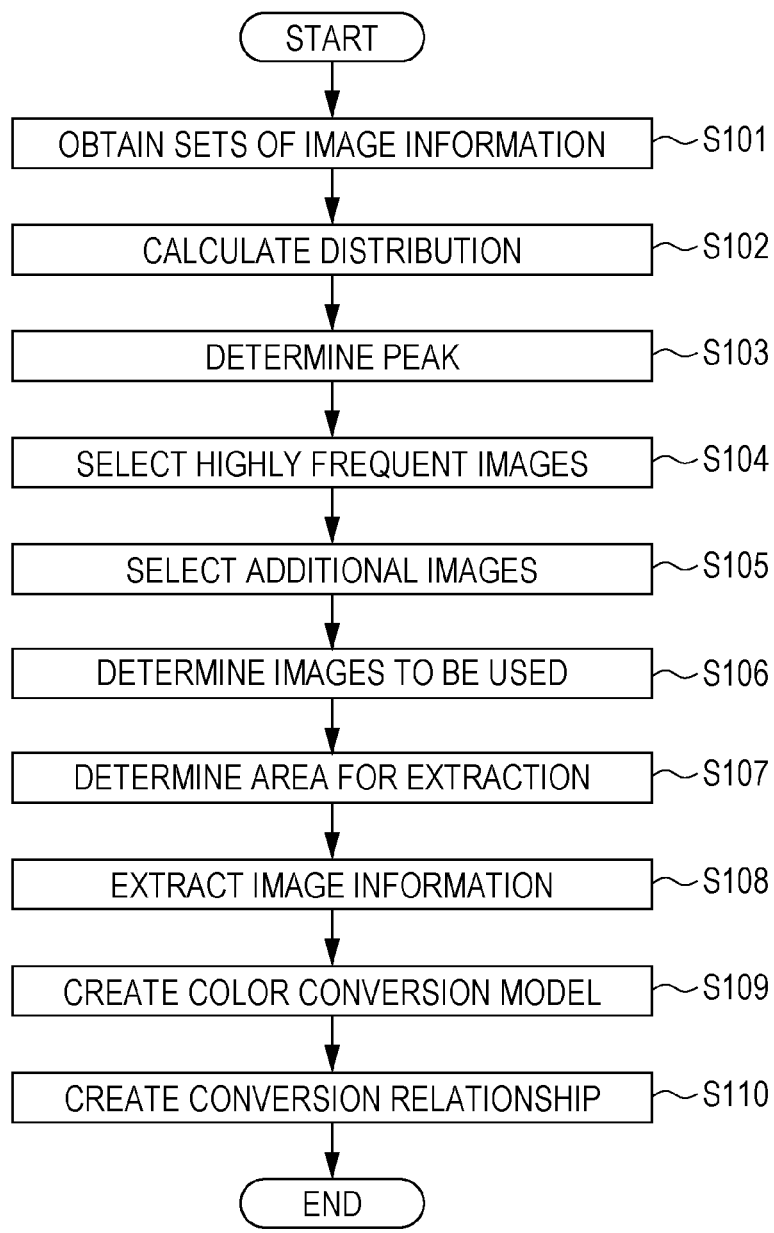
FIG. 10 is a flowchart illustrating operations of an image processing apparatus in a case of creating a color conversion model.

FIG. 10 is a flowchart for describing operations of the image processing apparatus 10 in a case of creating a color conversion model. The operations of the image processing apparatus 10 described below may be regarded as an image processing method that is used by the image processing apparatus 10 to create a color conversion model.

In a case of creating a color conversion model, first, the image information obtaining unit 11 obtains pieces of image information of images before color adjustment (color conversion) and pieces of image information of corresponding images after color conversion as sets of image information (step S101: acceptance step). In this case, the images before color adjustment are images captured by using the camera 40, and the images after color adjustment are images obtained as a result of a color adjustment made to the images captured by using the camera 40 by the user using, for example, the image processing apparatus 10.

Next, the analysis unit 12 analyzes image-capture setting information of the images before color adjustment (color conversion) in the sets of image information obtained by the image information obtaining unit 11. As a result, a distribution of the number of images before color adjustment (color conversion) relative to at least one type of image-capture setting information (here, for example, the f-number) as described with reference to FIG. 4 to FIG. 6 is calculated (step S102: analysis step).

Furthermore, the analysis unit 12 determines a peak (local maximum) in this distribution (step S103: peak determination step).

Next, the selection unit 13 selects, on the basis of the position of the peak and the image-capture setting information analyzed by the analysis unit 12, highly frequent images as images to be used in creating a color conversion model by the color conversion coefficient calculation unit 16 (step S104: highly-frequent-image selection step).

Next, the selection unit 13 selects, from among images not corresponding to a piece of image-capture setting information that corresponds to the highly frequent images, additional images (step S105: additional-image selection step). This process is performed by using a conversion relationship created for the highly frequent images and the method described with reference to FIG. 7.

The selection unit 13 determines the highly frequent images selected in step S104 and the additional images selected in step S105 to be images to be used in creating a color conversion model (step S106: image determination step).

Next, the area determination unit 14 determines an area, in each highly frequent image and in each additional image, from which image information is extracted for at least one image among the image before color adjustment (color conversion) and the image after color adjustment (step S107: extraction area determination step).

The image information extraction unit 15 extracts image information from within the area in the one image, among the image before color adjustment (color conversion) and the image after color adjustment, specified by the area determination unit 14 and from within an area, in the other image, corresponding to the area in the one image (step S108: image information extraction step).

Next, the color conversion coefficient calculation unit 16 creates a color conversion property (color conversion model) on the basis of the image information extracted in step S108 (step S109: color conversion property creation step).

Furthermore, the color conversion coefficient calculation unit 16 creates a conversion relationship for allowing a color adjustment similar to a previously made color adjustment on the basis of the color conversion model created in step S109 (step S110: conversion relationship creation step).

Figure 11:
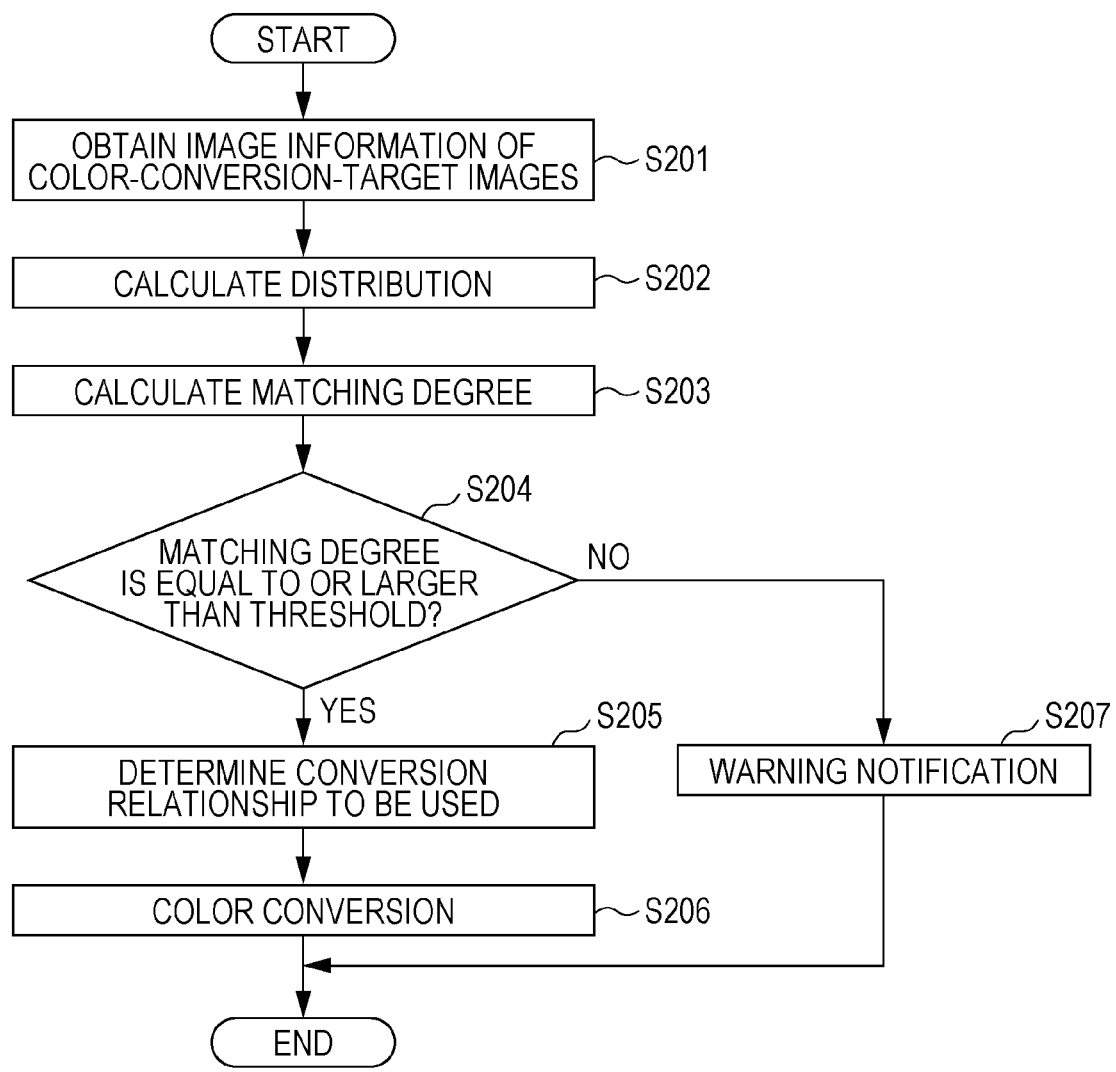
FIG. 11 is a flowchart illustrating operations of an image processing apparatus in a case of color conversion of color-conversion-target images.

FIG. 11 is a flowchart illustrating operations of the image processing apparatus 10 in a case of color conversion of color-conversion-target images.

In a case of color conversion of color-conversion-target images, first, the image information obtaining unit 11 obtains color-conversion-target images (step S201: color-conversion-target image obtaining step).

Next, the analysis unit 12 analyzes image-capture setting information of the color-conversion-target images. As a result, a distribution of the number of color-conversion-target images relative to at least one type of image-capture setting information (here, for example, the f-number) as described with reference to FIG. 4 to FIG. 6 is calculated (step S202: color-conversion-target image analysis step).

The analysis unit 12 compares the image-capture setting information of the color-conversion-target images with image-capture setting information of the images before color conversion selected when the color conversion model is created to calculate a matching degree (step S203: matching-degree calculation step).

The analysis unit 12 determines whether the matching degree is equal to or larger than a predetermined threshold (step S204: matching-degree determination step).

If the matching degree is equal to or larger than the predetermined threshold (Yes in step S204), the color conversion unit 18 determines a conversion relationship to be used (step S205: conversion relationship determination step), and performs color conversion on the color-conversion-target images (step S206: color conversion step). Accordingly, color-converted images obtained as a result of color conversion of the color-conversion-target images are output.

On the other hand, in step S204, if the matching degree is smaller than the predetermined threshold (No in step S204), the notification unit 17 sends a warning notification to the user (step S207: warning notification step). At this time, color conversion of the color-conversion-target images is stopped. However, the flow may proceed to step S206 to perform color conversion on the color-conversion-target images in accordance with the user's acknowledgement.

Now, step S103 in FIG. 10 is described in detail.

Figure 12:
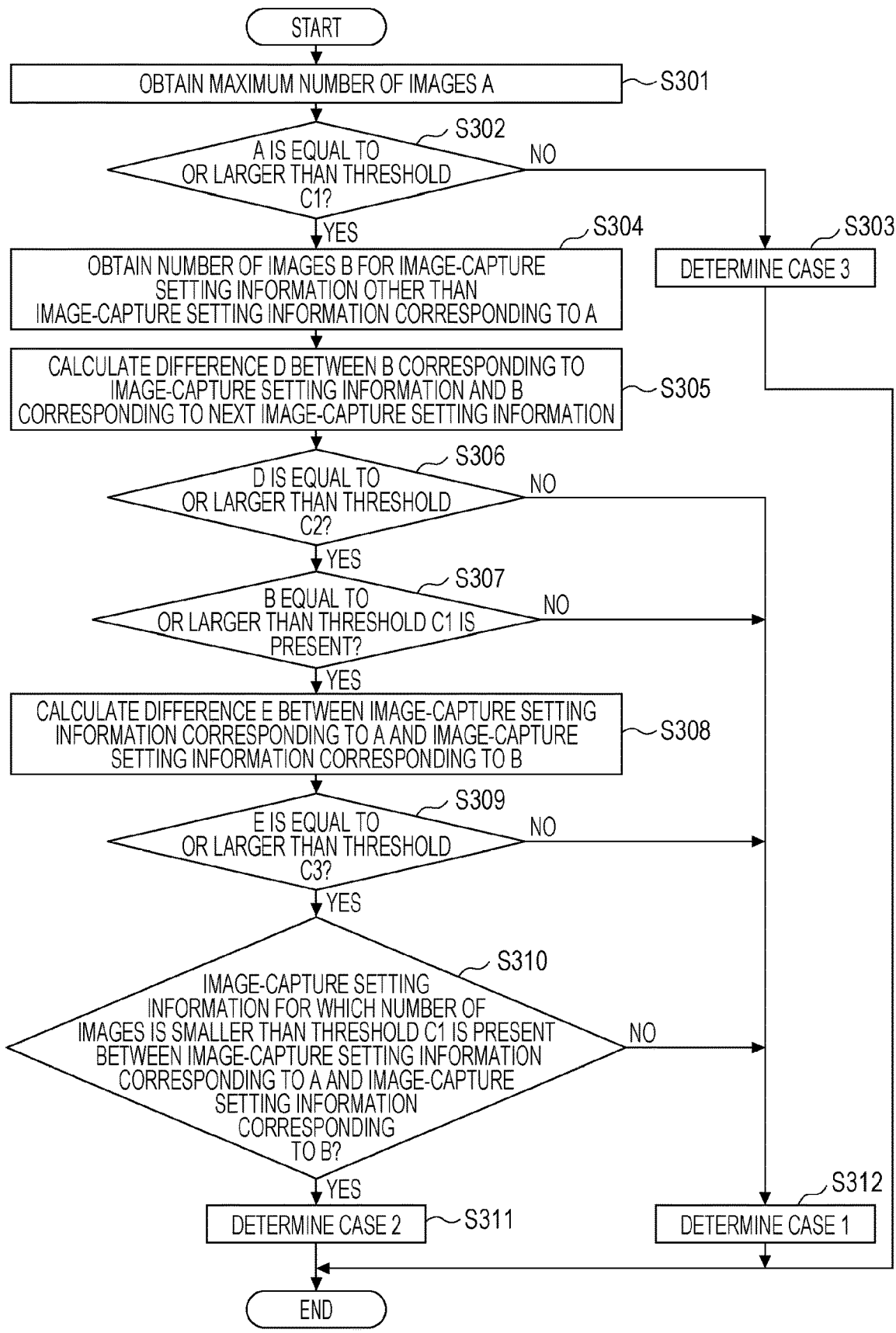
FIG. 12 is a flowchart illustrating a method for determining a peak (local maximum) by an analysis unit in a step in FIG. 10.

FIG. 12 is a flowchart illustrating a method for determining a peak (local maximum) by the analysis unit 12 in step S103 in FIG. 10.

First, the analysis unit 12 obtains the maximum number of images A from the distribution of the number of images before color adjustment (color conversion) relative to the f-number created in step S102 (step S301).

Next, the analysis unit 12 determines whether the number A is equal to or larger than a predetermined threshold C1 (step S302).

If the number A is smaller than the predetermined threshold C1 (No in step S302), the analysis unit 12 determines that the present case is case 3 as illustrated in FIG. 6 (step S303). That is, in this case, it is not possible to create a color conversion model.

On the other hand, if the number A is equal to or larger than the predetermined threshold C1 (Yes in step S302), the analysis unit 12 obtains the number of images B for each piece of image-capture setting information other than the piece of image-capture setting information corresponding to the number A (step S304). As a result, plural numbers B are obtained.

The analysis unit 12 calculates, for each piece of image-capture setting information, a difference D, which is the difference between the number B corresponding to the piece of image-capture setting information and the number B corresponding to the next piece of image-capture setting information (step S305).

Next, the analysis unit 12 determines whether the differences D include a difference that is equal to or larger than a predetermined threshold C2 (step S306). Accordingly, it is possible to determine whether a sharp peak is present.

If the differences D include a difference that is equal to or larger than the predetermined threshold C2 (Yes in step S306), that is, if a sharp peak is present, the analysis unit 12 determines whether the numbers B include a number B that is equal to or larger than the threshold C1 (step S307). Accordingly, it is possible to determine whether the sharp peak is equal to or larger than the threshold C1.

If the numbers B include a number B that is equal to or larger than the threshold C1 (Yes in step S307), that is, if a sharp peak equal to or larger than the threshold C1 is present, the analysis unit 12 calculates a difference E, which is the difference between the piece of image-capture setting information corresponding to the number A and the piece of image-capture setting information corresponding to this number B (step S308).

If the difference E between the pieces of image-capture setting information is equal to or larger than a threshold C3

(step S309), that is, if the pieces of image-capture setting information are far from each other, the analysis unit 12 determines whether a piece of image-capture setting information for which the number of images is smaller than the threshold C1 is present between the piece of image-capture setting information corresponding to the number A and the piece of image-capture setting information corresponding to the number B (step S310). Accordingly, it is possible to determine whether the peak is not continuous but is separated.

If a piece of image-capture setting information for which the number of images is smaller than the threshold C1 is present between the piece of image-capture setting information corresponding to the number A and the piece of image-capture setting information corresponding to the number B (Yes in step S310), that is, if the peak is separated, the analysis unit 12 determines that the present case is case 2 illustrated in FIG. 5 (step S311). That is, in this case, plural peaks are present.

On the other hand, if determination in step S306 results in No (if no sharp peak is present), if determination in step S307 results in No (if a sharp peak equal to or larger than the threshold C1 is not present), if determination in step S309 results in No (if the difference between peaks is small, that is, the difference between the pieces of image-capture setting information is small), or if determination in step S310 results in No, (if the peak is not separated), the analysis unit 12 determines that the present case is case 1 illustrated in FIG. 4 (step S312). That is, in this case, only one peak is present.

Now, step S105 in FIG. 10 is described in detail.

Figure 13:
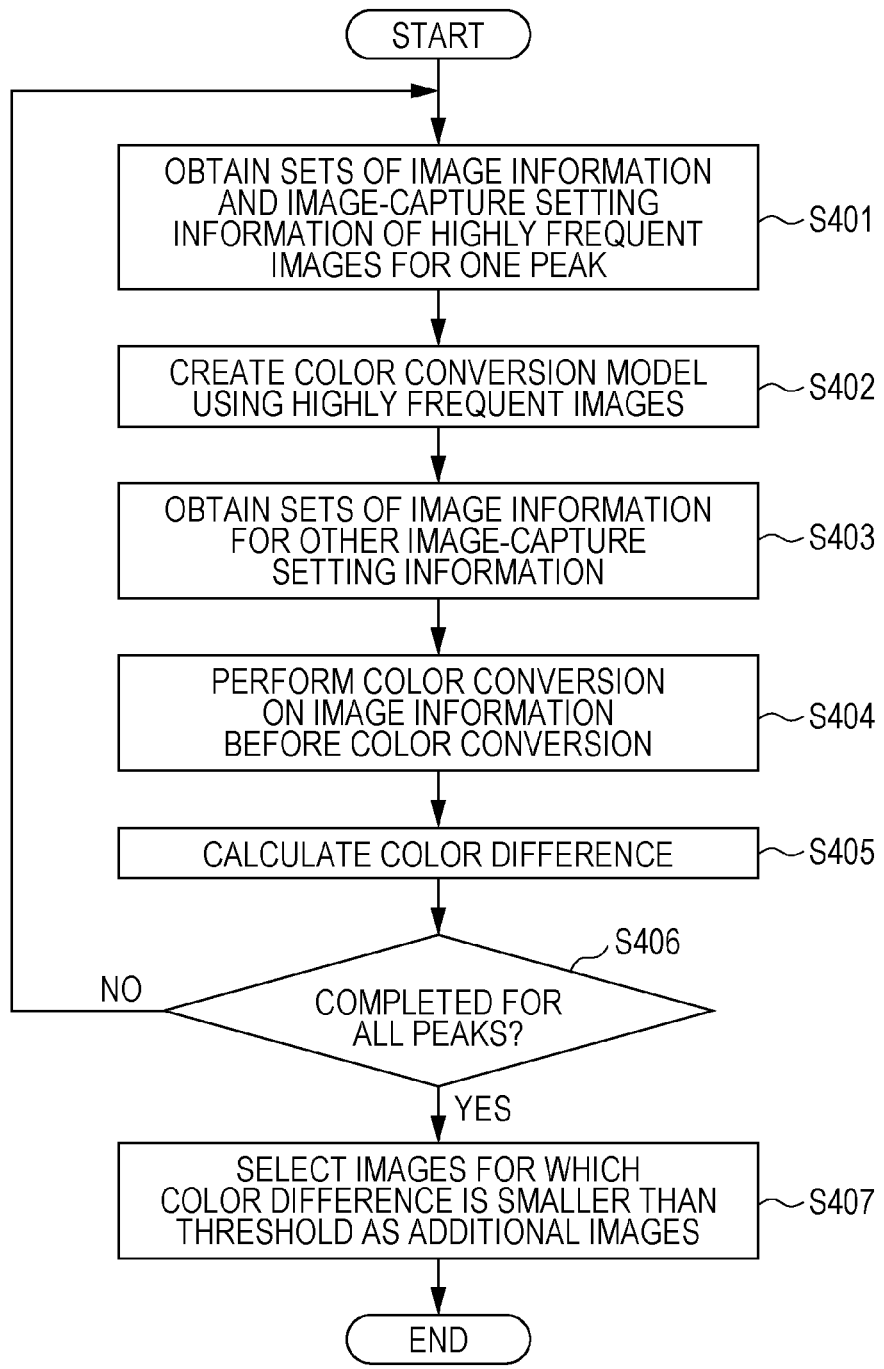
FIG. 13 is a flowchart illustrating a method for selecting additional images by a selection unit in a step in FIG. 10.

FIG. 13 is a flowchart illustrating a method for selecting additional images by the selection unit 13 in step S105 in FIG. 10.

First, the selection unit 13 obtains sets of image information and image-capture setting information of the highly frequent images for one peak (step S401).

Next, the color conversion coefficient calculation unit 16 creates a color conversion model from the sets of image information of the highly frequent images and further creates a conversion relationship (step S402). This conversion relationship is tentatively created for selection of additional images.

The selection unit 13 obtains sets of image information for each piece of image-capture setting information other than the piece of image-capture setting information that corresponds to the highly frequent images (step S403).

The color conversion unit 18 performs color conversion on image information of each image before color adjustment (color conversion) in the sets of image information obtained in step S403 by using the conversion relationship created in step S402 (step S404).

The selection unit 13 calculates the color difference (dE) between image information of the corresponding image after color adjustment (color conversion) and image information obtained as a result of color conversion in step S404 (step S405).

Next, the selection unit 13 determines whether processing is completed for all peaks (step S406).

If processing is not completed for all peaks (No in step S406), the flow returns to step S401.

On the other hand, if processing is completed for all peaks (Yes in step S406), the selection unit 13 selects images for which the color difference (dE) is smaller than a threshold as additional images, as described with reference to FIG. 7 (step S407).

In the above-described example, the case has been described where the analysis unit 12 analyzes only one type of image-capture setting information, namely, the f-number; however, the analysis unit 12 may analyze plural types of image-capture setting information.

Figures 14A, 14B:
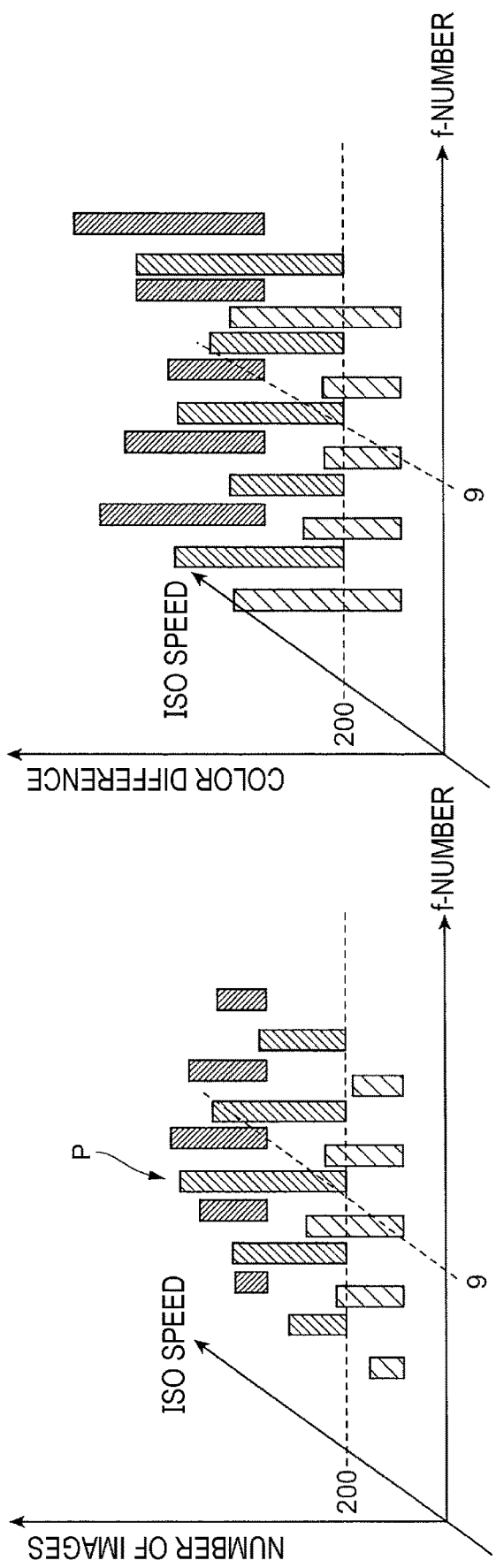
FIG. 14A is a diagram illustrating a case of an analysis of two types of image-capture setting information by an analysis unit.
FIG. 14B is a diagram illustrating a case of calculation of a color difference (dE) by a selection unit for selecting additional images.

FIG. 14A is a diagram illustrating a case of an analysis of two types of image-capture setting information by the analysis unit 12.

The example in FIG. 14A illustrates a case where a distribution of the number of images before color adjustment (color conversion) relative to two types of image-capture setting information, namely, the f-number and the ISO speed, is created. FIG. 14A corresponds to a case where the number of types of image-capture setting information, which is one in FIG. 4 to FIG. 6, is increased to two. Also in this case, it is possible to determine a peak (local maximum) P, and the number of images reaches its peak P when the image-capture setting information is such that the f-number is equal to 9 and the ISO speed is equal to 200.

FIG. 14B is a diagram illustrating a case of calculation of the color difference (dE) by the selection unit 13 for selecting additional images.

The example in FIG. 14B illustrates a case where a distribution of the color difference (dE) relative to two types of image-capture setting information, namely, the f-number and the ISO speed, is created. FIG. 14B corresponds to a case where the number of types of image-capture setting information, which is one in FIG. 7, is increased to two.

In the image processing apparatus 10 described in detail above, sets of image information that are more desirable for creating a color conversion property suitable for image-capture setting information of an image capturing unit are selected as highly frequent images. Additional images are further selected on the basis of the highly frequent images, and a color conversion property is created on the basis of theses images. That is, the highly frequent images are used as sets of image information most desirable for creating a color conversion property suitable for specific image-capture setting information and constitute a population of images serving as a training point. The additional images are used as sets of image information that are within an allowable range for creating a color conversion property suitable for specific image-capture setting information.

Accordingly, a color conversion property is created for each piece of image-capture setting information of an image capturing unit that obtains image information more easily than in the related art.

Description of Program

The processing performed by the image processing apparatus 10 in the exemplary embodiment described above is provided as, for example a program, such as application software.

Therefore, the processing performed by the image processing apparatus 10 in the exemplary embodiment may be regarded as a program for causing a computer to implement an acceptance function of accepting sets of image information each of which is composed of image information of an image before color conversion and image information of an image after color conversion; and a color conversion property creation function of creating a color conversion property for color conversion of an image on the basis of pieces of image-capture setting information that are set for image-capture conditions used when the images before color conversion are captured.

The program for implementing the exemplary embodiment may be provided via a communication system, as a matter of course, or may be stored in a recording medium, such as a compact disc read-only memory (CD-ROM), and provided.

The exemplary embodiment has been described; however, the technical scope of the present invention is not limited to the scope of the above-described exemplary embodiment. It is obvious from the description of the claims that various modifications and alterations made to the above-described exemplary embodiment are included in the technical scope of the present invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a processor, configured to:
accept sets of image information each of which is composed of image information of an image before color conversion and image information of an image after color conversion;
create a color conversion property for color conversion of an image on the basis of pieces of image-capture setting information that are set for image-capture conditions used when the images before color conversion are captured, wherein the image-capture conditions are settings of a camera that captures the images before color conversion; and
select, on the basis of the pieces of image-capture setting information, images that are used to create the color conversion property,
wherein the processor selects images that correspond to a piece of image-capture setting information for which the number of images is larger than the numbers of images that correspond to the other pieces of image-capture setting information among pieces of image-capture setting information that are set for at least one of the image-capture conditions, or images that correspond to a plurality of pieces of image-capture setting information including the piece of image-capture setting information.

2. The image processing apparatus according to claim 1, wherein
in a distribution of the number of images relative to the pieces of image-capture setting information, the processor selects images that correspond to a piece of image-capture setting information corresponding to a local maximum that is equal to or larger than a predetermined number of images, or images that correspond to a plurality of pieces of image-capture setting information including the piece of image-capture setting information.

3. The image processing apparatus according to claim 2, wherein
in a case where a plurality of local maxima are present, the processor selects images that correspond to a piece of image-capture setting information corresponding to one of the local maxima and images that correspond to a piece of image-capture setting information corresponding to another one of the local maxima if a difference between the pieces of image-capture setting information is equal to or larger than a predetermined value.

4. The image processing apparatus according to claim 1, wherein
in a distribution of the number of images before color conversion relative to the pieces of image-capture setting information that are set for at least one of the image-capture conditions, from among images not corresponding to a piece of image-capture setting information that corresponds to highly frequent images for which the number of images is larger, the processor selects, as an additional image, an image for which a difference determined by comparing image information obtained as a result of color conversion of the image, which is one of the images before color conversion, using the color conversion property that is created by using the highly frequent images with the image information of a corresponding one of the images after color conversion is within a predetermined range.

5. The image processing apparatus according to claim 4, wherein
if a piece of image-capture setting information for which the difference is equal to or larger than the predetermined range is present between a piece of image-capture setting information corresponding to an image for which the difference is within the predetermined range and the piece of image-capture setting information corresponding to the highly frequent images, the processor does not select the image as an additional image.

6. The image processing apparatus according to claim 1, wherein the processor is further configured to:
perform color conversion on a color-conversion-target image that is a target of color conversion using the color conversion property.

7. The image processing apparatus according to claim 6, wherein
the processor performs color conversion on the color-conversion-target image if a matching degree obtained by comparing a piece of image-capture setting information of the color-conversion-target image with a piece of image-capture setting information of the images before color conversion that are selected when the color conversion property is created is equal to or larger than a predetermined value.

8. The image processing apparatus according to claim 7, wherein the processor is further configured to:
send a warning notification if the matching degree is smaller than the predetermined value.

9. An image processing method co p sing:
accepting sets of image information each of which is composed of image information of an image before color conversion and image information of an image after color conversion;
creating a color conversion property for color conversion of an image on the basis of pieces of image-capture setting information that are set for image-capture conditions used when the images before color conversion are captured, wherein the image-capture conditions are settings of a camera that captures the images before color conversion; and
selecting, on the basis of the pieces of image-capture setting information, images that are used to create the color conversion property,
wherein the selected images are images that correspond to a piece of image-capture setting information for which the number of images is larger than the numbers of images that correspond to the other pieces of image-capture setting information among pieces of image-capture setting information that are set for at least one of the image-capture conditions, or images that correspond to a plurality of pieces of image-capture setting information including the piece of image-capture setting information.

10. A non-transitory computer readable medium storing a program causing a computer to execute a process for image processing, the process comprising:
  accepting sets of image information each of which is composed of image information of an image before color conversion and image information of an image after color conversion;
  creating a color conversion property for color conversion of an image on the basis of pieces of image-capture setting information that are set for image-capture conditions used when the images before color conversion are captured, wherein the image-capture conditions are settings of a camera that captures the images before color conversion; and
  selecting, on the basis of the pieces of image-capture setting information, images that are used to create the color conversion property,
  wherein the selected images are images that correspond to a piece of image-capture setting information for which the number of images is larger than the numbers of images that correspond to the other pieces of image-capture setting information among pieces of image-capture setting information that are set for at least one of the image-capture conditions, or images that correspond to a plurality of pieces of image-capture setting information including the piece of image-capture setting information.

11. An image processing apparatus comprising:
  a processor, configured to:
    accept sets of image information each of which is composed of image information of an image before color conversion and image information of an image after color conversion;
    create a color conversion property for color conversion of an image on the basis of pieces of image-capture setting information that are set for image-capture conditions used when the images before color conversion are captured, wherein the image-capture conditions are settings of a camera that captures the images before color conversion; and
    perform color conversion on a color-conversion-target image that is a target of color conversion using the color conversion property,
  wherein the processor performs color conversion on the color-conversion-target image if a matching degree obtained by comparing a piece of image-capture setting information of the color-conversion-target image with a piece of image-capture setting information of the images before color conversion that are selected when the color conversion property is created is equal to or larger than a predetermined value.

12. An image processing method comprising:
  accepting sets of image information each of which is composed of image information of an image before color conversion and image information of an image after color conversion;
  creating a color conversion property for color conversion of an image on the basis of pieces of image-capture setting information that are set for image-capture conditions used when the images before color conversion are captured, wherein the image-capture conditions are settings of a camera that captures the images before color conversion; and
  performing color conversion on a color-conversion-target image that is a target of color conversion using the color conversion property,
  wherein the color conversion is performed on the color-conversion-target age if a matching degree obtained by comparing a piece of image-capture setting information of the color-conversion-target image with a piece of image-capture setting information of the images before color conversion that are selected when the color conversion property is created is equal to or larger than a predetermined value.

13. A non-transitory computer readable medium storing a program causing a computer to execute a process for image processing, the process comprising:
  accepting sets of image information each of which is composed of image information of an image before color conversion and image information of an image after color conversion;
  creating a color conversion property for color conversion of an image on the basis of pieces of image-capture setting information that are set for image-capture conditions used when the images before color conversion are captured, wherein the image-capture conditions are settings of a camera that captures the images before color conversion; and
  performing color conversion on a color-conversion-target image that is a target of color conversion using the color conversion property,
  wherein the color conversion is performed on the color-conversion-target image if a matching degree obtained by comparing a piece of image-capture setting information of the color-conversion-target image with a piece of image-capture setting information of the images before color conversion that are selected when the color conversion property is created is equal to or larger than a predetermined value.

* * * * *